(12) United States Patent
Jacobson

(10) Patent No.: US 9,162,560 B2
(45) Date of Patent: Oct. 20, 2015

(54) FLYWHEEL ASSEMBLY FOR A POWERTRAIN

(75) Inventor: Evan Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 328 days.

(21) Appl. No.: 13/570,777

(22) Filed: Aug. 9, 2012

(65) Prior Publication Data

US 2014/0045651 A1 Feb. 13, 2014

(51) Int. Cl.
*B60K 6/10* (2006.01)
*B60W 10/24* (2006.01)

(52) U.S. Cl.
CPC .............. *B60K 6/105* (2013.01); *B60W 10/24* (2013.01); *Y02T 10/6204* (2013.01); *Y10T 477/638* (2015.01)

(58) Field of Classification Search
CPC ............................ B60K 6/105; Y02T 10/6204
See application file for complete search history.

(56) References Cited

U.S. PATENT DOCUMENTS

| | | | |
|---|---|---|---|
| 4,037,409 A * | 7/1977 | Leibach | ............................ 60/413 |
| 4,499,965 A | 2/1985 | Oetting et al. | |
| 4,606,193 A | 8/1986 | Molina | |
| 4,680,986 A | 7/1987 | Elsner | |
| 6,024,667 A | 2/2000 | Krohm et al. | |
| 7,540,346 B2 | 6/2009 | Hu | |
| 2010/0117375 A1 | 5/2010 | Kwok | |
| 2010/0152984 A1 | 6/2010 | Bowman et al. | |
| 2010/0184549 A1* | 7/2010 | Sartre et al. | ........................ 475/5 |
| 2011/0114406 A1 | 5/2011 | Gibson et al. | |
| 2011/0175370 A1 | 7/2011 | Dugas | |

FOREIGN PATENT DOCUMENTS

WO   WO 82/01519   5/1982
WO   WO 2007/138353 A2   12/2007

* cited by examiner

*Primary Examiner* — Robert Hodge
*Assistant Examiner* — Ryan Dodd
(74) *Attorney, Agent, or Firm* — Miller, Matthias & Hull LLP

(57) ABSTRACT

A powertrain for a machine may include a flywheel and a drivetrain having multiple configurations to permit the flywheel to be mechanically connected both upstream and downstream of a transmission. A bypass clutch may be used to selectively couple the flywheel directly to the engine, while a flywheel clutch may be used to selectively couple the flywheel directly to a lower powertrain. In both upsteam and downstream modes of operation, the transmission is bypassed to increase flywheel energy storage and use, as well as expanding the functionality of the flywheel.

12 Claims, 4 Drawing Sheets

FLYWHEEL ASSEMBLY FOR A POWERTRAIN

TECHNICAL FIELD

The present disclosure generally relates to flywheel energy storage devices, and more particularly to systems and methods for efficiently storing and deploying energy from flywheel assemblies provided on machines.

BACKGROUND

Flywheels are generally known in the art for storing energy. While flywheel energy storage devices have been used for many years in satellite or other spacecraft applications, more recently they have been adapted for use on terrestrial machines. More specifically, hybrid power plants have been proposed which use a combustion engine as the primary mover and a flywheel as a secondary mover.

In some applications, the flywheel is operably coupled directly to an engine output, such as a crankshaft, upstream of a transmission. The flywheel may add to or subtract from power supplied by the engine to the transmission and, ultimately, one or more driven wheels. In this arrangement, the flywheel may also be configured to use regenerative braking, in which the flywheel is sped up to capture kinetic energy of the machine as it decelerates. Conversely, when the machine is accelerating, the flywheel may provide additional power to the wheels, thereby reducing flywheel speed. The position of the flywheel upstream of the transmission may allow it to efficiently spin up to a desired operating speed during start up. During regenerative braking, however, the energy from the ground engaging members may be transmitted through several mechanical connections, including the transmission, before it reaches the flywheel. Consequently, the amount of energy that can be captured by an upstream-located flywheel may be reduced by the mechanical losses as it travels through the transmission and other mechanical connections, thereby decreasing the efficiency of the flywheel.

In other applications, the flywheel may be operably coupled to a drivetrain output downstream of the transmission. When the machine decelerates, energy from the drivetrain (and an associated transmission) may be transferred to the flywheel. During acceleration of the machine, energy from the flywheel may be transferred to the powertrain to assist with the increased power demand. When positioned downstream of the transmission, the flywheel may more efficiently capture energy during regenerative braking due to the decrease in mechanical connections between the flywheel and the ground engaging members, thereby reducing the mechanical loss. During start up, however, the drivetrain may not be configured to spin up the flywheel during machine start up. Additionally, the location of the flywheel downstream of the transmission may make such spin up inefficient due to mechanical loss through the transmission.

U.S. Pat. No. 4,499,965 to Oetting et al. discloses a hybrid drive that includes both an engine flywheel and a storage flywheel. The engine flywheel is configured to compensate for non-uniformities in engine output torque, while the storage flywheel is configured to store energy during regenerative braking Both the engine flywheel and the storage flywheel are positioned upstream of the transmission, and therefore suffer from the drawbacks noted above. Conversely, U.S. Patent Application Publication No. 2010/0152984 to Bowman et al. discloses a hybrid vehicle having a flywheel connected to a lower powertrain assembly, downstream of a transmission. The flywheel of Bowman et al. is not coupled to the engine, and therefore is incapable of engine-powered spin up.

SUMMARY OF THE DISCLOSURE

In accordance with one aspect of the disclosure, a powertrain is provided for a machine having a ground engaging member. The powertrain may include an engine, a transmission having a transmission input shaft operably coupled to the engine and a transmission output shaft, and a lower powertrain configured to provide torque output to the ground engaging member, the lower powertrain including a lower powertrain input shaft. A bypass shaft may be operably coupled to the transmission input shaft. A first flywheel may include a first flywheel shaft and a first flywheel body coupled to the first flywheel shaft, and a bypass clutch may be configured to selectively couple the bypass shaft to the first flywheel shaft. A flywheel clutch may be configured to selectively couple the first flywheel shaft to the lower powertrain input shaft. A controller may be operably coupled to the bypass clutch and the flywheel clutch, and may be configured to selectively operate in a flywheel upstream mode, in which the bypass clutch is engaged and the flywheel clutch is disengaged, and to selectively operate in a flywheel downstream mode, in which the bypass clutch is disengaged and the flywheel clutch is engaged.

In another aspect of the disclosure that may be combined with any of these aspects, a method is provided of operating a flywheel on a machine having an engine, a transmission having a transmission input shaft operably coupled to the engine and a transmission output shaft, and a ground engaging member operably coupled to the transmission output shaft. The method may include selectively operating in a flywheel upstream mode by directly coupling the flywheel to the transmission input shaft, and decoupling the flywheel from the ground engaging member, and selectively operating in a flywheel downstream mode by directly coupling the flywheel to the ground engaging member, and decoupling the flywheel from the transmission input shaft.

In another aspect of the disclosure that may be combined with any of these aspects, a flywheel assembly is provided for use with a drivetrain including a transmission having a transmission input shaft operably coupled to an engine and a transmission output shaft, and a lower powertrain configured to provide torque output to a ground engaging member and including a lower powertrain input shaft. The flywheel assembly may include a bypass shaft operably coupled to the transmission input shaft, and a first flywheel including a first flywheel shaft and a first flywheel body coupled to the first flywheel shaft. A bypass clutch may be configured to selectively couple the bypass shaft to the first flywheel shaft, and a flywheel clutch may be configured to selectively couple the first flywheel shaft to the lower powertrain input shaft. A controller may be operably coupled to the bypass clutch and the flywheel clutch and configured to selectively operate in a flywheel upstream mode, in which the bypass clutch is engaged and the flywheel clutch is disengaged, and to selectively operate in a flywheel downstream mode, in which the bypass clutch is disengaged and the flywheel clutch is engaged.

DETAILED DESCRIPTION

Embodiments of a flywheel assembly are disclosed for use with a machine having an engine. In some embodiments, the flywheel assembly may be used with a drivetrain configured to provide alternative points at which the flywheel may be connected to the drivetrain. For example, the drivetrain may be configured to allow the flywheel to be coupled both upstream and downstream of a transmission that may be operably coupled to the engine. The alternative connection points may increase flywheel efficiency during different modes of powertrain operation by allowing the operator to choose a connection point that minimizes mechanical loss for a given mode. In certain modes of operation, such as during initial "spin up" of the flywheel during start-up of the machine, it may be advantageous to directly connect the flywheel to the engine and bypass the transmission to reduce the amount of mechanical loss during such operation. In other modes of operation, such as during regenerative braking, it may be advantageous to directly connect the flywheel to the lower powertrain, again bypassing the transmission and associated mechanical loss. By providing a drivetrain that permits the flywheel to be connected at points both upstream and downstream of the transmission, the flywheel assembly may improve the overall efficiency of the flywheel during all modes of operation.

Figure 1:
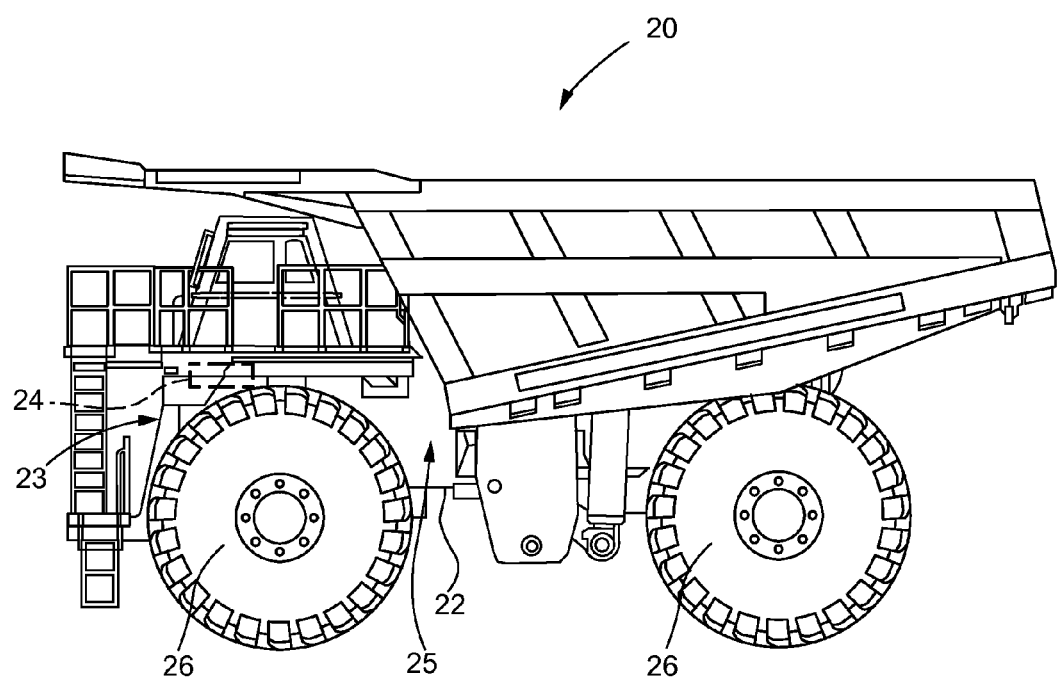
FIG. 1 is a side elevation view of a machine having a flywheel assembly according to the present disclosure.

FIG. 1 illustrates an exemplary machine 20. The machine 20 may be a mining truck, as shown, or any other type of machine, including on-highway machines, off-highway machines, earth moving equipment, generators, aerospace machines, locomotive machines, marine machines, or other engine powered applications. The machine 20 may include a chassis 22 and a powertrain 23 mounted on the chassis. The powertrain 23 may include a prime mover, such as an internal combustion engine 24, operably coupled to a drivetrain 25. The engine 24 may be any type of engine (internal combustion, gas, diesel, gaseous fuel, natural gas, propane, etc.), may be of any size, with any number of cylinders, and in any configuration ("V," in-line, radial, etc.). In the illustrated embodiment, the engine 24 generates power that may be delivered by the drivetrain 25 to ground engaging members 26. The ground engaging members 26 may be tires (as shown), tracks, or the like that may be suitable for a particular application.

Figure 2:
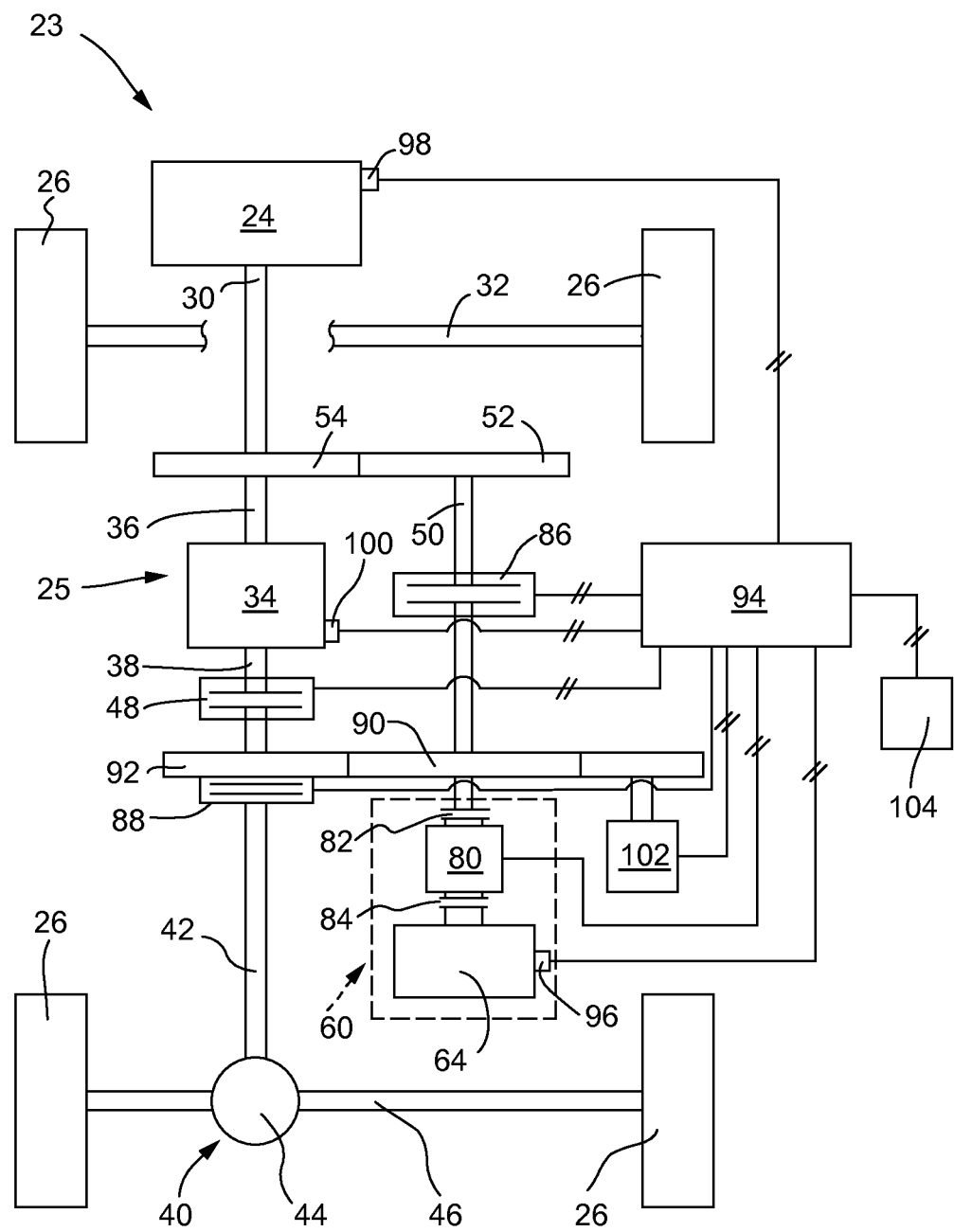
FIG. 2 is a schematic illustration of an exemplary embodiment of a flywheel assembly in conjunction with a powertrain provided on the machine of FIG. 1.

The drivetrain 25 may mechanically couple the engine 24 to one or more of the ground engaging members 26. As schematically illustrated in FIG. 2, the drivetrain 25 may be configured for rear wheel drive. Accordingly, the drivetrain 25 may include a transmission 34 having a transmission input shaft 36 operably coupled to the engine 24 and a transmission output shaft 38. A lower powertrain 40 may have a lower powertrain input shaft 42 operably coupled to the transmission output shaft 38. In the illustrated embodiment, the lower powertrain may include a differential 44 operably coupled to a rear axle 46 which may provide a torque output to two rear ground engaging members 26. A transmission output clutch 48 is configured to selectively couple the transmission output shaft 38 to the lower powertrain input shaft 42. Additionally or alternatively, the drivetrain 25 may be configured for front wheel or all wheel drive (not shown).

The drivetrain 25 may further include a bypass shaft 50 connected in parallel to the transmission input shaft 36 to provide a mechanical connection that bypasses the transmission 34. In the illustrated embodiment, the bypass shaft 50 may be coupled to a bypass gear 52 that engages a transmission input gear 54 coupled to the transmission input shaft 36. Accordingly, the bypass shaft 50 may be directly coupled to the engine 24 via the gears 52, 54, transmission input shaft 36, and the crankshaft 30.

Figure 3:
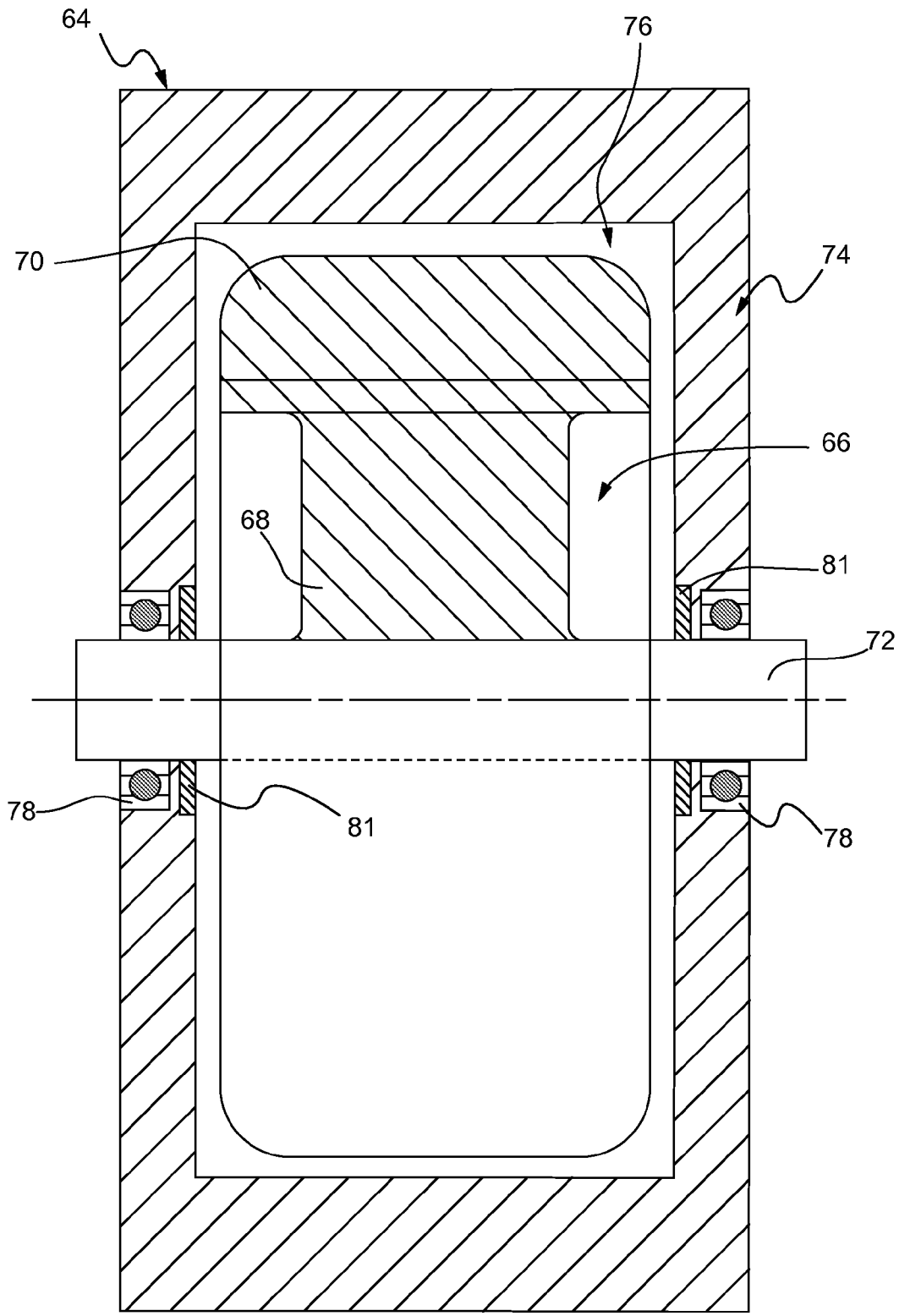
FIG. 3 is an enlarged schematic illustration of a flywheel used in the flywheel assembly of FIG. 2.

A flywheel assembly 60 may be provided for storing energy from and/or discharging energy to the machine 20. As best shown in FIG. 3, the flywheel assembly 60 may include a first flywheel 64. The first flywheel 64 may include a first flywheel body 66 having a hub 68 and a rim 70. The hub 68 may be formed of a material, such as aluminum or steel, which is suitable for supporting the mass of the rim 70 when the first flywheel body 66 rotates at speeds of up to 60,000 rpm or more. The rim 70 may be formed of any suitable flywheel material, such as iron, steel, or carbon fiber. A first flywheel shaft 72 may be coupled to the hub 68 and supported for rotation by a first flywheel housing 74.

The first flywheel housing 74 may define a chamber 76 sized to receive the first flywheel body 66 and at least a portion of the first flywheel shaft 72. Bearings 78 may be coupled to opposite sides of the first flywheel housing 74 to journally support respective portions of the first flywheel shaft 72. Two shaft seals 81 may be disposed between opposite sides of the first flywheel housing 74 and the first flywheel shaft 72 to provide air tight seals. A vacuum pump (not shown) may fluidly communicate with the chamber 76 to generate a partial vacuum inside the first flywheel housing 74. The first flywheel 64 may further include a cooling system (not shown) to maintain the flywheel chamber 76 at a desirable operating temperature.

The flywheel assembly 60 may further include a continuously variable transmission (CVT) 80 for accommodating differences in rotational speeds of the flywheel and the drivetrain 25. A first CVT clutch 82 may be configured to selectively couple the CVT 80 to an upstream segment of the first flywheel shaft 72, while a second CVT clutch 84 may be configured to selectively couple the CVT 80 to a downstream segment of the first flywheel shaft 72. Alternatively, the CVT 80 may be replaced with other known mechanisms for interfacing between shafts rotating at different speeds. Still further, such structure may be completely eliminated by the use of other gearing in the drivetrain 25 that may sufficiently match the speeds of the flywheel and the drivetrain 25.

The drivetrain 25 further may be configured so that the flywheel assembly 60 may be directly coupled to different points of the drivetrain 25 located upstream and downstream of the transmission 34. For example, a bypass clutch 86 may be configured to selectively couple the first flywheel shaft 72 to the bypass shaft 50, thereby to provide a direct mechanical connection between the first flywheel 64 and the engine 24. Additionally, a flywheel clutch 88 may be configured to selectively couple the first flywheel shaft 72 to the lower powertrain input shaft 42, thereby to provide a direct mechanical connection between the first flywheel 64 and the lower powertrain 40. In the illustrated embodiment, the flywheel clutch 88 may be a rotating-type clutch as shown, which permits the lower powertrain gear 92 to rotate freely on the lower powertrain input shaft 42 when the clutch is disengaged.

A controller, such as electronic control module (ECM) 94, may be provided to control operation of components provided on the machine 20. For example, the ECM 94 may be operably coupled to the engine 24, the transmission 34, the transmission output clutch 48, the CVT 80, the bypass clutch 86, and the flywheel clutch 88 to control operation of these components based on user inputs or feedback regarding operating parameters. The ECM 94 may include any components that may be used to run an application such as, for example, a memory, a secondary storage device, and a central processing unit. The ECM 94 may, however, contain additional or different components such as, for example, mechanical or hydromechanical devices. Various other known circuits may be associated with the ECM 94 such as, for example, power supply circuitry, signal-conditioning circuitry, solenoid driver circuitry, and other appropriate circuitry. While the ECM 94 is depicted in the drawings as a single controller, connected, multiple controllers may be used.

One or more feedback sensors may be provided for monitoring operating parameters of the machine 20. For example, a flywheel speed sensor 96 may be provided that is configured to sense a rotational speed of the first flywheel 64 and generate a flywheel speed signal. Additionally or alternatively, an engine speed sensor 98 may be provided that is configured to sense an engine speed and generate an engine speed signal, and a drivetrain speed sensor 100 may be provided that is configured to sense a rotational speed of a drivetrain component, such as the transmission 34, and generate a drivetrain speed signal. Still further, the command signal to the CVT 80 may be monitored for feedback.

The machine 20 may further include an auxiliary device that may be powered by the flywheel assembly 60. For example, a hydraulic pump 102 may be operably coupled to the first flywheel shaft 72. The hydraulic pump 102 may be used to operate any hydraulically powered system provided on the machine 20. The hydraulic pump 102 further may be operatively coupled to the ECM 94.

An input device 104, such as a user-engageable switch, may be located on the machine 20 to control a configuration of the drivetrain 25, as explained in greater detail below.

Figure 4:
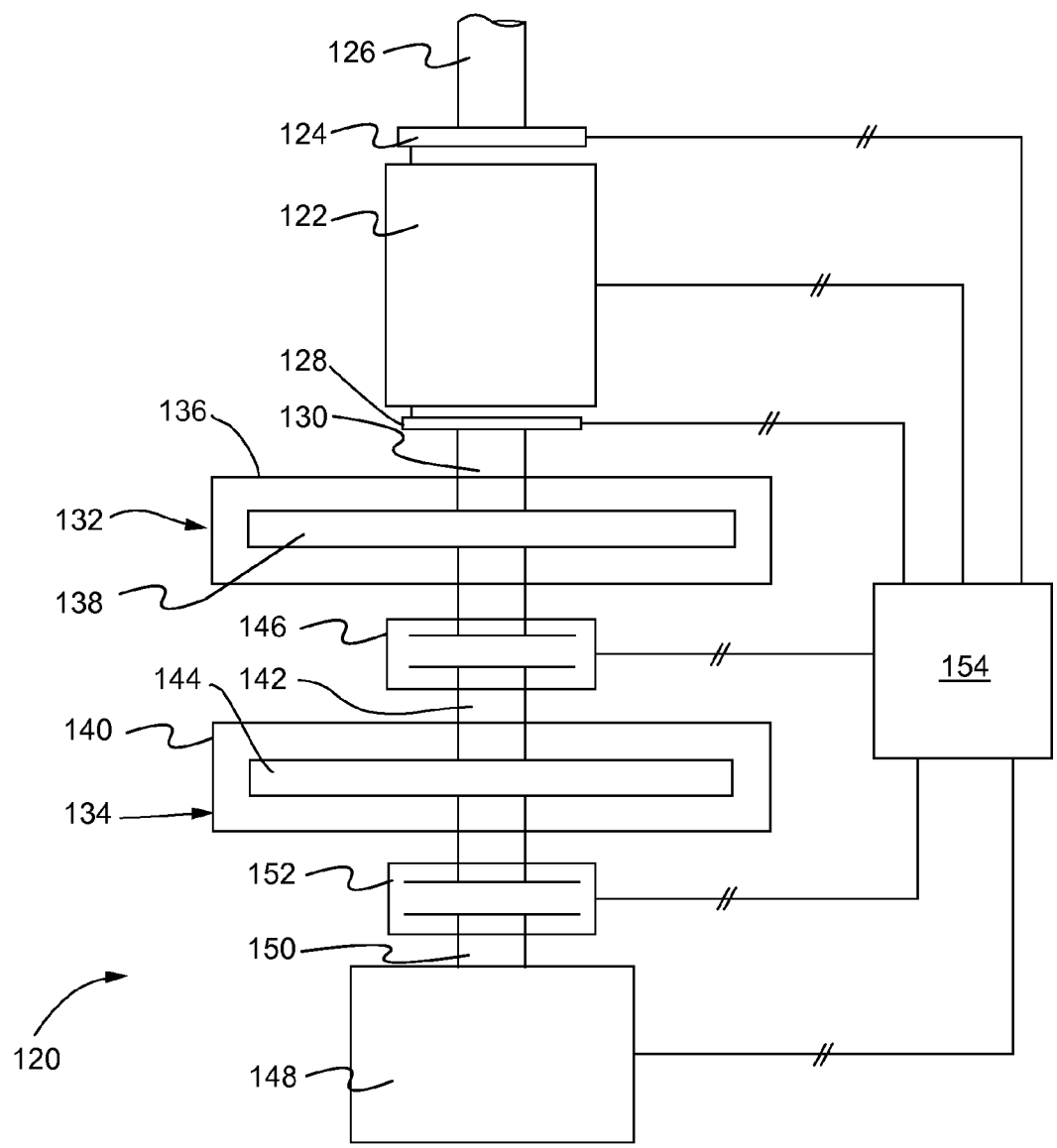
FIG. 4 is an enlarged schematic illustration of an alternative embodiment of a flywheel assembly according to the present disclosure.

An alternative exemplary embodiment of a flywheel assembly 120 is illustrated in FIG. 4. A flywheel input clutch, such as a CVT 122, may be provided to accommodate differences in rotational speeds between the flywheel assembly 120 and a drivetrain (not shown). Accordingly, a first CVT clutch 124 may be configured to selectively couple the CVT 122 to a flywheel input shaft 126, while a second CVT clutch 128 may be configured to selectively couple the CVT 122 to a first flywheel shaft 130. The flywheel input shaft 126 may be operably coupled to an engine (not shown) by the drivetrain.

The flywheel assembly 120 may have multiple separate flywheels to increase the energy storage capacity of the system. In the exemplary embodiment illustrated in FIG. 4, the flywheel assembly 120 includes first and second flywheels 132, 134. While only two flywheels 132, 134 are shown, it will be appreciated that the flywheel assembly 120 may include more than two flywheels without departing from the scope of this disclosure. The first flywheel 132 may include a first flywheel housing 136 configured to rotatably support the first flywheel shaft 130 (introduced above). A first flywheel body 138 may be coupled to the first flywheel shaft 130 and disposed in the first flywheel housing 136. Similarly, the second flywheel 134 may include a second flywheel housing 140 rotatably supporting a second flywheel shaft 142. A second flywheel body 144 may be coupled to the second flywheel shaft 142 and disposed in the second flywheel housing 140.

The first and second flywheel shafts 130, 142 may be selectively coupled to respectively rotate the first and second flywheel bodies 138, 144 at desired speeds. In the illustrated embodiment, a flywheel intermediate clutch 146 is configured to selectively couple the first flywheel shaft 130 to the second flywheel shaft 142.

In an alternative embodiment, the second flywheel 134 may be operated independently of the first flywheel 132. For example, the drivetrain 25 may include mechanical components to form a second bypass (not shown) that connects the second flywheel shaft 142 to the output of the CVT 122 while bypassing the first flywheel shaft 130. Accordingly, the second flywheel 134 may be rotated without requiring rotation of the first flywheel 132.

An electric motor/generator 148 may be configured to provide energy to or draw energy from the flywheel assembly 120. In the illustrated embodiment, the electric motor/generator 148 includes a motor/generator shaft 150. A motor/generator clutch 152 may be provided to selectively couple the motor/generator shaft 150 to the second flywheel shaft 142. The electric motor/generator 148 may draw power from the flywheel assembly 120 to operate auxiliary systems, or may provide power to the flywheel assembly 120 to initiate or maintain desired rotational speeds of the first and/or second flywheels 132, 134.

A controller, such as an ECM 154, may be operatively coupled to the CVT 122, the first and second CVT clutches 124, 128, the flywheel intermediate clutch 146, the motor/generator clutch 152, and the motor/generator 148. The ECM 154 may be configured to send signals to each of these devices. Additionally, the ECM 154 may be configured to receive feedback from the devices. The ECM 154 further may be configured to operate the coupled devices, as discussed in greater detail below.

Industrial Applicability

Certain of the exemplary embodiments of flywheel assemblies and methods may be advantageously employed on machines having ground engaging members. The flywheel assembly 60 may be coupled to a drivetrain 25 that may selectively allow the flywheel assembly 60 to be directly connected both upstream and downstream of a transmission 34. Such a drivetrain arrangement may increase efficiency of the flywheel assembly 60 in multiple modes of operation.

More specifically, the ECM 94 may be configured to operate the drivetrain 25 in multiple alternative modes. Some of the modes may provide a direct mechanical connection path between the flywheel assembly 60 and the engine 24. For example, in a flywheel spin up mode, the flywheel assembly 60 may be brought to a desired rotational speed prior to rotating the ground engaging members 26. In the flywheel spin up mode, the bypass clutch 86 may be engaged, the transmission output clutch 48 may be disengaged, and the flywheel clutch 88 may be disengaged. With the drivetrain 25 configured in this manner, the first flywheel shaft 72 may be directly connected to the engine 24 through the bypass clutch 86, bypass shaft 50, and transmission input shaft 36. By mechanically connecting the flywheel assembly 60 upstream of the transmission 34, thereby bypassing the transmission 34, mechanical losses between the engine 24 and flywheel assembly 60 may be reduced and therefore power output from the engine 24 may be more efficiently captured by the flywheel assembly 60. The transmission output shaft 38 may be decoupled from the lower powertrain 40 by the disengaged transmission output clutch 48 and the first flywheel shaft 72 may be decoupled from the lower powertrain 40 by the disengaged flywheel clutch 88, so the machine 20 may not travel during initial spin up mode.

The spin up mode configuration of the drivetrain 25 may also assist with engine starting or restarting. During engine starting or restarting, power from the flywheel assembly 60 may be provided to the engine 24. The flywheel assembly 60 may already have a sufficient amount of stored kinetic energy, such as when the flywheel assembly 60 is still rotating from previous machine operation. Alternatively, another source of power, such as the electric motor/generator 148 of the embodiment shown in FIG. 4, may be used to first rotate the flywheel assembly to a sufficient speed before engaging the bypass clutch 86, thereby to provide power to the engine 24.

An alternative mode using a direct mechanical connection path between the flywheel assembly 60 and the engine 24 may be a load leveling mode, in which power from the flywheel assembly 60 may be used to assist power output from the engine 24. In the load leveling mode, the bypass clutch 86 may be engaged, the transmission output clutch 48 may be engaged, and the flywheel clutch 88 may be disengaged. With the drivetrain 25 configured in this manner, power from the flywheel assembly 60 may directly assist power from the engine 24 to rotate the transmission input shaft 36. As a result, the engine 24 may be sized for less than peak power capacity since the flywheel assembly 60 may be used to assist with high load conditions.

Other drivetrain modes may provide a direct mechanical connection path between the flywheel assembly 60 and the lower powertrain 40. For example, the ECM 94 further may be configured to operate the drivetrain 25 in a regeneration mode, during which the flywheel assembly 60 receives power from braking applied to the ground engaging members 26. In the regeneration mode, the bypass clutch 86 may be disengaged, the transmission output clutch 48 may be disengaged, and the flywheel clutch 88 may be engaged. With the drivetrain 25 configured in this manner, the first flywheel shaft 72 may be directly connected to the ground engaging members 26 through the lower powertrain input shaft 42, differential 44, and the rear axle 46. By mechanically connecting the flywheel assembly 60 downstream of the transmission 34, thereby bypassing the transmission 34, mechanical losses between the ground engaging members 26 and the flywheel assembly 60 may be reduced and therefore power generated by braking may be more efficiently captured by the flywheel assembly.

An alternative mode using a direct mechanical connection path between the flywheel assembly 60 and the lower powertrain 40 may be an acceleration mode, in which power from the flywheel assembly 60 is used to assist power from the transmission output shaft 38 to rotate the lower powertrain 40. In the acceleration mode, the bypass clutch 86 may be disengaged, the transmission output clutch 48 may be engaged, and the flywheel clutch 88 may be engaged. With the drivetrain 25 configured in this manner, power from the flywheel assembly 60 may directly assist power from the transmission 34 to rotate the ground engaging members 26.

The ECM 94 further may be configured to operate the drivetrain 25 in an auxiliary power mode, during which an auxiliary device (such as the hydraulic pump 102) may be operated by the flywheel assembly 60. In the auxiliary power mode, each of the bypass clutch 86, transmission output clutch 48, and flywheel clutch 88 may be disengaged, so that only the auxiliary device is coupled to the flywheel assembly 60. By isolating the other drivetrain components, mechanical losses are again reduced and therefore power is more efficiently output from the flywheel to the hydraulic pump 102. Additionally, the auxiliary device may be operated with the engine 24 turned off.

By providing a drivetrain 25 having alternative modes of operation to connect the flywheel assembly 60 either upstream or downstream of the transmission 34, the flywheel assembly 60 may more efficiently store and release power as desired.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A powertrain for a machine having a ground engaging member, the powertrain comprising:
   an engine;
   a transmission having a transmission input shaft operably coupled to the engine and a transmission output shaft;
   a lower powertrain continuously coupled to the ground engaging member and configured to provide torque output to the ground engaging member, the lower powertrain including a lower powertrain input shaft operably coupled to the transmission output shaft;
   a bypass shaft operably coupled to the transmission input shaft;
   a first flywheel including a first flywheel shaft and a first flywheel body coupled to the first flywheel shaft;
   a bypass clutch configured to selectively couple the bypass shaft to the first flywheel shaft;
   a flywheel clutch configured to selectively couple the first flywheel shaft to the lower powertrain input shaft independent of the bypass clutch; and
   a controller operably coupled to the bypass clutch and the flywheel clutch, the controller being configured to:
     selectively operate in a flywheel upstream mode, in which the bypass clutch is engaged and the flywheel clutch is disengaged;
     selectively operate in a flywheel downstream mode in which the bypass clutch is disengaged and the flywheel clutch is engaged.

2. The powertrain of claim 1, further including a transmission output clutch configured to selectively couple the transmission output shaft to the lower powertrain input shaft, wherein the controller is operably coupled to the transmission output clutch.

3. The powertrain of claim 2, wherein the flywheel upstream mode comprises a flywheel spin up mode, and wherein the transmission output clutch is disengaged.

4. The powertrain of claim 2, wherein the flywheel upstream mode comprises a load leveling mode, and wherein the transmission output clutch is engaged.

5. The powertrain of claim 2, wherein the flywheel downstream mode comprises a regeneration mode, and wherein the transmission output clutch is disengaged.

6. The powertrain of claim 2, wherein the flywheel downstream mode comprises an acceleration mode, and wherein the transmission output clutch is engaged.

7. The powertrain of claim 2, further including an auxiliary device operably coupled to the first flywheel shaft, wherein the controller is further configured to selectively operate in an auxiliary power mode in which the bypass clutch is disengaged, the transmission output clutch is disengaged, and the flywheel clutch is disengaged.

8. The powertrain of claim 7, wherein the auxiliary device comprises a hydraulic pump.

9. The powertrain of claim 1, further including a second flywheel having a second flywheel shaft rotatably coupled to the first flywheel shaft and a second flywheel body coupled to the second flywheel shaft, and an intermediate flywheel clutch configured to selectively couple the second flywheel shaft to the first flywheel shaft.

10. The powertrain of claim 1, further including a motor/generator operably coupled to the first flywheel shaft.

11. A flywheel assembly for use with a drivetrain including a transmission having a transmission input shaft operably coupled to an engine and a transmission output shaft, and a lower powertrain continuously coupled to the ground engaging member and configured to provide torque output to a ground engaging member, the lower powertrain including a lower powertrain input shaft operably coupled to the transmission output shaft, the flywheel assembly including:
- a bypass shaft operably coupled to the transmission input shaft;
- a first flywheel including a first flywheel shaft and a first flywheel body coupled to the first flywheel shaft;
- a bypass clutch configured to selectively couple the bypass shaft to the first flywheel shaft;
- a flywheel clutch configured to selectively couple the first flywheel shaft to the lower powertrain input shaft independent of the bypass clutch; and
- a controller operably coupled to the bypass clutch and the flywheel clutch, the controller being configured to:
    - selectively operate in a flywheel upstream mode, in which the bypass clutch is engaged and the flywheel clutch is disengaged;
    - selectively operate in a flywheel downstream mode in which the bypass clutch is disengaged and the flywheel clutch is engaged.

12. The flywheel assembly of claim 11, further including a transmission output clutch configured to selectively couple the transmission output shaft to the lower powertrain input shaft, wherein the controller is operably coupled to the transmission output clutch.

* * * * *